(12) United States Patent
Migita et al.

(10) Patent No.: US 9,946,148 B2
(45) Date of Patent: Apr. 17, 2018

(54) IMAGE PROJECTION UNIT AND IMAGE PROJECTION APPARATUS

(71) Applicant: KONICA MINOLTA, INC., Chiyoda-ku (JP)

(72) Inventors: Yasutake Migita, Sakai (JP); Hiroshi Hirasawa, Sakai (JP); Daisuke Haga, Osakasayama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/317,533

(22) PCT Filed: May 21, 2015

(86) PCT No.: PCT/JP2015/064567
§ 371 (c)(1),
(2) Date: Dec. 9, 2016

(87) PCT Pub. No.: WO2015/190254
PCT Pub. Date: Dec. 17, 2015

(65) Prior Publication Data
US 2017/0123303 A1 May 4, 2017

(30) Foreign Application Priority Data
Jun. 13, 2014 (JP) .................................. 2014-122645

(51) Int. Cl.
*G03B 33/12* (2006.01)
*G02B 27/12* (2006.01)
(Continued)

(52) U.S. Cl.
CPC ......... *G03B 33/12* (2013.01); *G02B 27/1026* (2013.01); *G02B 27/126* (2013.01);
(Continued)

(58) Field of Classification Search
CPC .... G03B 21/005; G03B 21/008; G03B 21/28; G03B 21/2066; H04N 9/315;
(Continued)

(56) References Cited

U.S. PATENT DOCUMENTS 6,330,114 B1 * 12/2001 Park ..................... G02B 27/149
353/33
7,144,116 B2 12/2006 Huang
(Continued)

FOREIGN PATENT DOCUMENTS

CN 102033289 4/2011
CN 103217797 7/2013
(Continued)

OTHER PUBLICATIONS

Office Action dated Sep. 28, 2017 which issued in the corresponding Chinese Patent Application No. 201580031316.X.

*Primary Examiner* — Sultan Chowdhury
(74) *Attorney, Agent, or Firm* — Cozen O'Connor

(57) ABSTRACT

An image projection unit includes: a light source unit; a plurality of reflection-type image display elements; a plurality of total reflection prisms configured to guide lights of multiple colors emitted from the light source unit to the reflection-type image display elements and to emit the lights reflected from the reflection-type image display elements; a color synthesis prism configured to receive the lights emitted from the total reflection prisms, synthesize the lights, and emit the synthesized lights; a holding member fixed to the color synthesis prism and holding the reflection-type image display elements; and a base member supporting the color synthesis prism and the plurality of total reflection prisms

17 Claims, 17 Drawing Sheets

(51) Int. Cl.
*G02B 27/10* (2006.01)
*G03B 21/00* (2006.01)
*G03B 21/20* (2006.01)

(52) U.S. Cl.
CPC ....... *G03B 21/008* (2013.01); *G03B 21/2013* (2013.01); *G03B 21/2086* (2013.01)

(58) Field of Classification Search
CPC .. H04N 9/3152; H04N 9/3126; H04N 9/3141; H04N 9/3164
See application file for complete search history.

(56) References Cited

U.S. PATENT DOCUMENTS

| | | | |
|---|---|---|---|
| 2006/0007401 A1 | 1/2006 | Ho et al. | |
| 2006/0044521 A1* | 3/2006 | Vandorpe | G02B 5/04 353/33 |
| 2007/0103647 A1* | 5/2007 | Egawa | G03B 21/16 353/54 |
| 2007/0132959 A1* | 6/2007 | Shanley | H04N 9/3152 353/31 |
| 2011/0122374 A1* | 5/2011 | Maeda | G03B 21/008 353/81 |
| 2012/0170000 A1* | 7/2012 | Imaoka | G02B 27/283 353/20 |

FOREIGN PATENT DOCUMENTS

| | | |
|---|---|---|
| JP | H 10-319524 | 12/1998 |
| JP | 2005-092206 | 4/2005 |
| JP | 2006-154602 | 6/2006 |
| JP | 2006-251459 | 9/2006 |
| JP | 2007-279436 | 10/2007 |
| JP | 2007-534004 | 11/2007 |
| JP | 2011-027821 | 2/2011 |

* cited by examiner

IMAGE PROJECTION UNIT AND IMAGE PROJECTION APPARATUS

RELATED APPLICATIONS

This is a U.S. National Phase Application under 35 USC 371 of International Application PCT/JP2015/064567 filed on May 21, 2015.

This application claims the priority of Japanese application no. 2014-122465 filed June 13, 2014, the entire content of which is hereby incorporated by reference.

TECHNICAL FIELD

The present invention relates to an image projection unit and an image projection apparatus.

BACKGROUND ART

Recently, a small-sized and lightweight image projection apparatus has been developed. This type of image projection apparatus is configured not to include a heavy Philips prism as disclosed for example in U.S. Pat. No. 7,144,116 (PTD 1), and includes total reflection prisms, digital mirror devices, and a color synthesis prism, for example. Light is split into a plurality of color lights which are reflected by the total reflection prisms to be incident on the digital mirror devices. The lights reflected by the digital mirror devices toward the color synthesis prism are synthesized by the color synthesis prism to thereby form an image.

The image projection apparatus is required to project an image with high precision. Japanese Laid-Open Patent Publication No. 10-319524 (PTD 2) for example is a document disclosing an image projection apparatus which is different in structure from the image projection apparatus disclosed in PTD 1, but with which registration deviation can be prevented and an excellent image can be obtained.

The image projection apparatus disclosed in PTD 2 includes polarization beam splitters, light valves, and a color synthesis prism. Light entering the polarization beam splitter is polarized and separated, and only the S-polarized light of the polarized and separated light is incident on the light valve. The light reflected from the light valve passes through the polarization beam splitter, enters the color synthesis prism, and is synthesized by the color synthesis prism.

The light valve is fixed to the polarization beam splitter so that the load of the light valve is exerted on the polarization beam splitter. With the registration adjusted, the light valve and the polarization beam splitter are integrated together to thereby enable prevention of registration deviation.

CITATION LIST

Patent Document

PTD 1: U.S. Pat. No. 7,144,116
PTD 2: Japanese Laid-Open Patent Publication No. 10-319524

SUMMARY OF INVENTION

Technical Problem

If the structure disclosed in PTD 2 is applied to the image projection apparatus disclosed in PTD 1 in order to suppress registration deviation, the digital mirror device may be fixed by bonding to the total reflection prism, and the color synthesis prism may be fixed by bonding to the total reflection prism. However, the total reflection prism differs in structure from the polarization beam splitter which is formed with reflection surfaces joined to each other, and the total reflection prism has an air gap layer between two optical elements so as to form a total reflection plane. Due to this, the coupling intensity given by the total reflection prism as a prism lock is weaker than that of the polarization beam splitter.

Therefore, if the image projection apparatus disclosed in PTD 1 is configured so that the color synthesis prism is fixed by bonding to the total reflection prism and the total reflection prism is fixed by bonding to the digital mirror, there is concern about the possibility that the total reflection prism is broken down along the planes facing the air gap, due to impact resulting from falling of the apparatus, thermal expansion, and respective weights of the digital mirror device and fittings or the like attached therearound.

Moreover, even in the case where the total reflection prism is not broken down, there is still concern about the possibility that the digital mirror device and the color synthesis prism are deviated in positional relation from each other, due to expansion of the air gap layer. In this case, registration deviation occurs and an excellent image cannot be obtained.

The present invention has been made in view of the problems as described above. An object of the present invention is to provide an image projection unit and an image projection apparatus which each include a color synthesis prism, total reflection prisms each having an air gap, and digital mirror devices, and in which registration deviation is less likely to occur.

Solution to Problem

In order to achieve at least one of the above-described objects, an image projection unit reflecting one aspect of the present invention includes: a light source unit; a plurality of reflection-type image display elements each formed of a plurality of microscopic mirrors arranged on a matrix; a plurality of total reflection prisms each provided for a corresponding reflection-type image display element among the plurality of reflection-type image display elements, and configured to guide light emitted from the light source unit to the corresponding reflection-type image display element and to emit the light reflected from the corresponding reflection-type image display element; a color synthesis prism configured to receive respective lights emitted from the plurality of total reflection prisms, synthesize the lights, and emit the synthesized lights; a holding member fixed to the color synthesis prism and holding the plurality of reflection-type image display elements; and a base member supporting the color synthesis prism and the plurality of total reflection prisms.

Advantageous Effects of Invention

According to the present invention, an image projection unit and an image projection apparatus can be provided which each include a color synthesis prism, total reflection prisms each having an air gap, and digital mirror devices, and in which registration deviation is less likely to occur.

DESCRIPTION OF EMBODIMENTS

Figure 1:
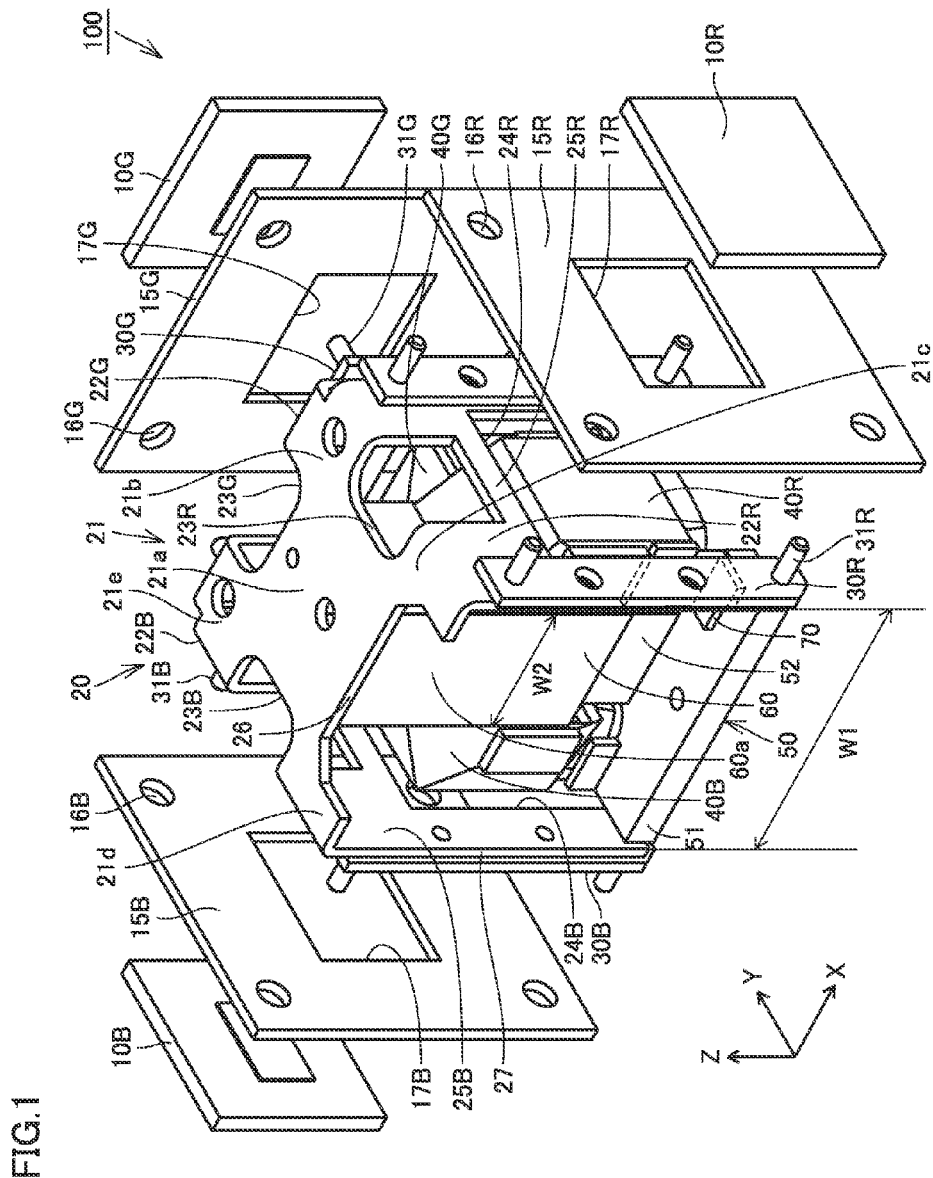
FIG. 1 is an exploded diagram of an image projection unit in a first embodiment.

Embodiments of the present invention will hereinafter be described in detail with reference to the drawings. In the following embodiments, the same or common parts are denoted by the same reference characters in the drawings, and a description thereof will not be repeated. It is originally intended that respective features of a plurality of embodiments below, if any, are combined as appropriate, unless otherwise specified.

First Embodiment

Figure 2:
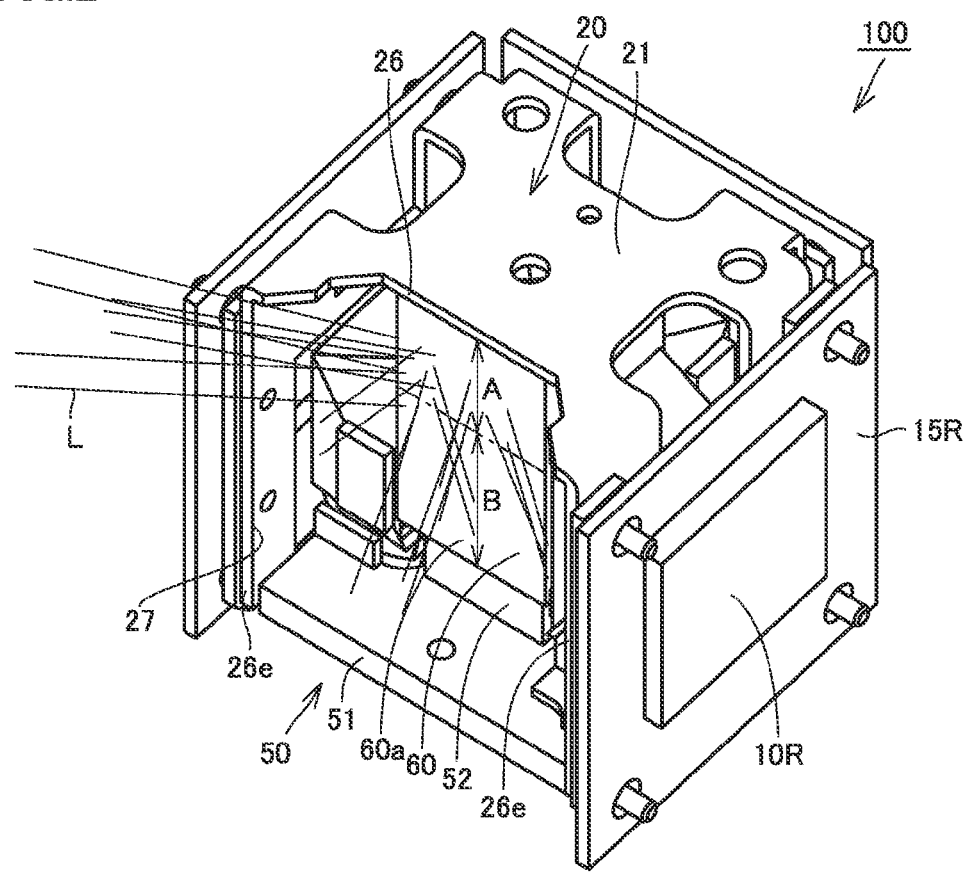
FIG. 2 is a diagram showing a structure of the image projection unit in FIG. 1 and OFF light emitted from the image projection unit.

FIG. 1 is an exploded diagram of an image projection unit in the present embodiment. FIG. 2 is a diagram showing a structure of the image projection unit in FIG. 1, and OFF light emitted from the image projection unit. Referring to FIGS. 1 and 2, an image projection unit 100 in the present embodiment will be described.

As shown in FIGS. 1 and 2, image projection unit 100 in the present embodiment mainly includes digital mirror devices 10R, 10G, 10B as reflection-type image display elements, a holding member 20, total reflection prisms 40R, 40G, 40B, a base member 50, and a color synthesis prism 60.

Image projection unit 100 includes three digital mirror devices 10R, 10G, 10B as well as three total reflection prisms 40R, 40G, 40B, and is configured to synthesize, by color synthesis prism 60, three color lights into which the light emitted from a light source unit 89 (see FIG. 3) described later herein is separated.

Color synthesis prism 60 is formed of a cross dichroic prism which is made up of a combination of four triangular prisms, for example. Total reflection prisms 40R, 40G, 40B are arranged to cover three sides of color synthesis prism 60. Color synthesis prism 60 has an emission surface 60a from which light is emitted. Emission surface 60a is located at the side which is not covered with total reflection prisms 40R, 40G, 40B. Emission surface 60a includes an OFF light emission region A from which OFF light is emitted as described later herein, and an ON light emission region B from which ON light is emitted as described later herein.

Base member 50 is located in a bottom portion in the drawings, and is a member for supporting color synthesis prism 60 and total reflection prisms 40R, 40G, 40B. Base member 50 includes a foundation 51 and a supporting rest 52. At a substantially central area of foundation 51, supporting rest 52 supporting color synthesis prism 60 is disposed. Color synthesis prism 60 is fixed by bonding to supporting rest 52. For base member 50, SUS or the like may be used which has a linear expansion coefficient close to those of color synthesis prism 60 and total reflection prisms 40R, 40G, 40B, for example. Preferably, foundation 51 and supporting rest 52 are configured as an integrated part.

Holding member 20 holds digital mirror devices 10R, 10G, 10B so that respective loads of digital mirror device 10R, 10G, 10B will not be exerted on total reflection prisms 40R, 40G, 40B. For holding member 20, SUS or the like may be used which has a linear expansion coefficient close to those of color synthesis prism 60 and total reflection prisms 40R, 40G, 40B, for example.

Holding member 20 includes a top plate 21, side plates 22R, 22G, 22B, and reflection-type image display element holding plates 15R, 15G, 15B. Top plate 21 of holding member 20 is directly fixed to color synthesis prism 60 with an adhesive.

Top plate 21 is disposed to sandwich color synthesis prism 60 between top plate 21 and base member 50. Top plate 21 has a centrally located plate-like portion 21a having a substantially square shape, and corner portions 21b to 21e disposed at respective four corners of plate-like portion 21a and having a substantially rectangular shape.

Side plates 22R, 22G, 22B extend from top plate 21 toward base member 50. Side plates 22R, 22G, 22B are fixed to base member 50 with an elastic adhesive such as Super X White. Thus, when a thermal shock or an external force such as vibration is applied, collision between base member 50 and holding member 20 can be prevented. Moreover, as compared with the case where base member 50 and holding member 20 are firmly fixed, elastic deformation enables absorption of stress caused by shock or temperature change, and therefore, peeling of other fixedly bonded parts can be prevented.

Side plate 22R is disposed to extend from corner portion 21b and corner portion 21c toward the bottom in the drawings (in the negative Z-axis direction). Side plate 22R is disposed to be located outside the two opposite ends, in the Y-axis direction, of total reflection prism 40R, as seen from the right side in the drawings (in the negative X-axis direction).

Side plate 22G is disposed to extend from corner portion 21b and corner portion 21e toward the bottom in the drawings (in the negative Z-axis direction). Side plate 22G is disposed to be located outside the two opposite ends, in the X-axis direction, of total reflection prism 40G, as seen from the rear side (in the negative Y-axis direction).

Side plate 22B is disposed to extend from corner portion 21e and corner portion 21d toward the bottom in the drawings (in the negative Z-axis direction). Side plate 22B is disposed to be located outside the two opposite ends, in the Y-axis direction, of total reflection prism 40G, as seen from the left side (in the X-axis direction).

Moreover, holding member 20 has voids 26, 27 for avoiding interference of ON light and OFF light reflected from digital mirror devices 10R, 10G, 10B with ON light and OFF light entering color synthesis prism 60 through total reflection prisms 40R, 40G, 40B and emitted from this color synthesis prism 60.

Void 26 is provided in top plate 21 and configured to extend in the direction of the normal to emission surface 60a (negative Y-axis direction) and accordingly expand in respective directions of the two opposite ends (X-axis direction). Void 27 (opening) communicates with void 26 and is configured not to overlap emission surface 60a as seen in the direction of the normal to emission surface 60a. Void 27 is defined by the end of side plate 22R and the end of side plate 22B that are located opposite to digital mirror device 10G. Distance W1 between the end of side plate 22R and the end of side plate 22B is larger than width W2 of color synthesis prism 60.

Holding member 20 further includes substantially L-shaped voids 23R, 23G, 23B extending from top plate 21 to side plates 22R, 22G, 22B, respectively. Depending on the reflection characteristics of a red light reflection surface 61 and a blue light reflection surface 62 of color synthesis prism 60 described later herein, OFF light may be emitted from a surface other than emission surface 60a as shown in FIG. 2. In this case, the OFF light can be released from voids 23R, 23G, 23B and mixture of the ON light and the OFF light can be prevented.

To above-described side plates 22R, 22G, 22B respectively, attachments 30R, 30G, 30B are attached for holding reflection-type image display element holding plates 15R, 15G, 15B. Attachments 30R, 30G, 30B have respective protrusions 31R, 31G, 31B protruding outward. Protrusions 31R, 31G, 31B fit in corresponding holes 16R, 16G, 16B provided in reflection-type image display element holding plates 15R, 15G, 15B described later herein. Thus, reflection-type image display element holding plates 15R, 15G, 15B are held.

Reflection-type image display element holding plates 15R, 15G, 15B hold digital mirror devices 10R, 10G, 10B, respectively. Reflection-type image display element holding plates 15R, 15G, 15B have respective windows 17R, 17G, 17B so as not to interfere with optical paths formed between digital mirror devices 10R, 10G, 10B and corresponding total reflection prisms 40R, 40G, 40B.

Digital mirror devices 10R, 10G, 10B are each an image forming element spatially modulating incident light depending on the direction in which the light is to be reflected. Digital mirror devices 10R, 10G, 10B are each formed of many microscopic micromirrors arranged on a matrix. Individual micromirrors are capable of changing the reflection angle between two directions, independently of one another.

Individual micromirrors correspond to respective pixels of an image to be projected on a screen. A micromirror with its reflection angle set to one of the two directions is in an "ON" state. The light reflected from this ON-state micromirror (ON light) passes through the total reflection prism and enters color synthesis prism 60. The ON lights entering color synthesis prism 60 are synthesized by this color synthesis prism 60 and emitted from emission surface 60a toward a projection lens 99 (see FIG. 3) described later herein.

On the contrary, a micromirror with its reflection angle set to the other of the two directions is in an "OFF" state. The light reflected from this OFF-state micromirror (OFF light) enters color synthesis prism 60 through the total reflection prism. The OFF light entering color synthesis prism 60 is emitted from emission surface 60a of color synthesis prism 60 so that the OFF light will not enter projection lens 99. The paths of the OFF Light will be described later herein with reference to FIGS. 4 to 6.

Total reflection prisms 40R, 40G, 40B are each formed of a first prism and a second prism which are each substantially in the shape of a triangular prism. Between respective oblique surfaces of the first and second prisms, an air gap (see 43G in FIG. 5) is provided. Total reflection prisms 40R, 40G, 40B are arranged outside color synthesis prism 60.

In order to avoid collision between total reflection prisms 40R, 40G, 40B and color synthesis prism 60 when an external force or thermal shock is applied, preferably a frame-like spacer formed of a resin member or the like, for example, is disposed between total reflection prism 40R, 40G, 40B and color synthesis prism 60. The shape of the resin member may be appropriately selected without being limited to the shape of the frame. Namely, the region between color synthesis prism 60 and each of a plurality of total reflection prisms 40R, 40G, 40B may be filled at least partially with the resin member. In addition to the spacer, a transparent resin member may be disposed between total reflection prism 40R, 40G, 40B and color synthesis prism 60 for the sake of dust-proofing.

Each of total reflection prisms 40R, 40G, 40B is supported on base member 50 with a corresponding prism holding member 70. Details of the total reflection prisms will be given with reference to FIGS. 4 to 6, referring particularly to total reflection prism 40G.

Prism holding member 70 is substantially L-shaped, for example. Prism holding member 70 is directly fixed to base member 50 with an adhesive and a fastening member. While FIG. 1 shows only prism holding member 70 holding total reflection prism 40R, total reflection prisms 40G, 40B are also held by prism holding members (not shown) having a similar structure. For example, in the case where total reflection prism 40G is held by a prism holding member (not shown), the prism holding member is fixed to a non-light-reached region 48G (FIG. 6) of the total reflection prism described later herein.

Figure 3:
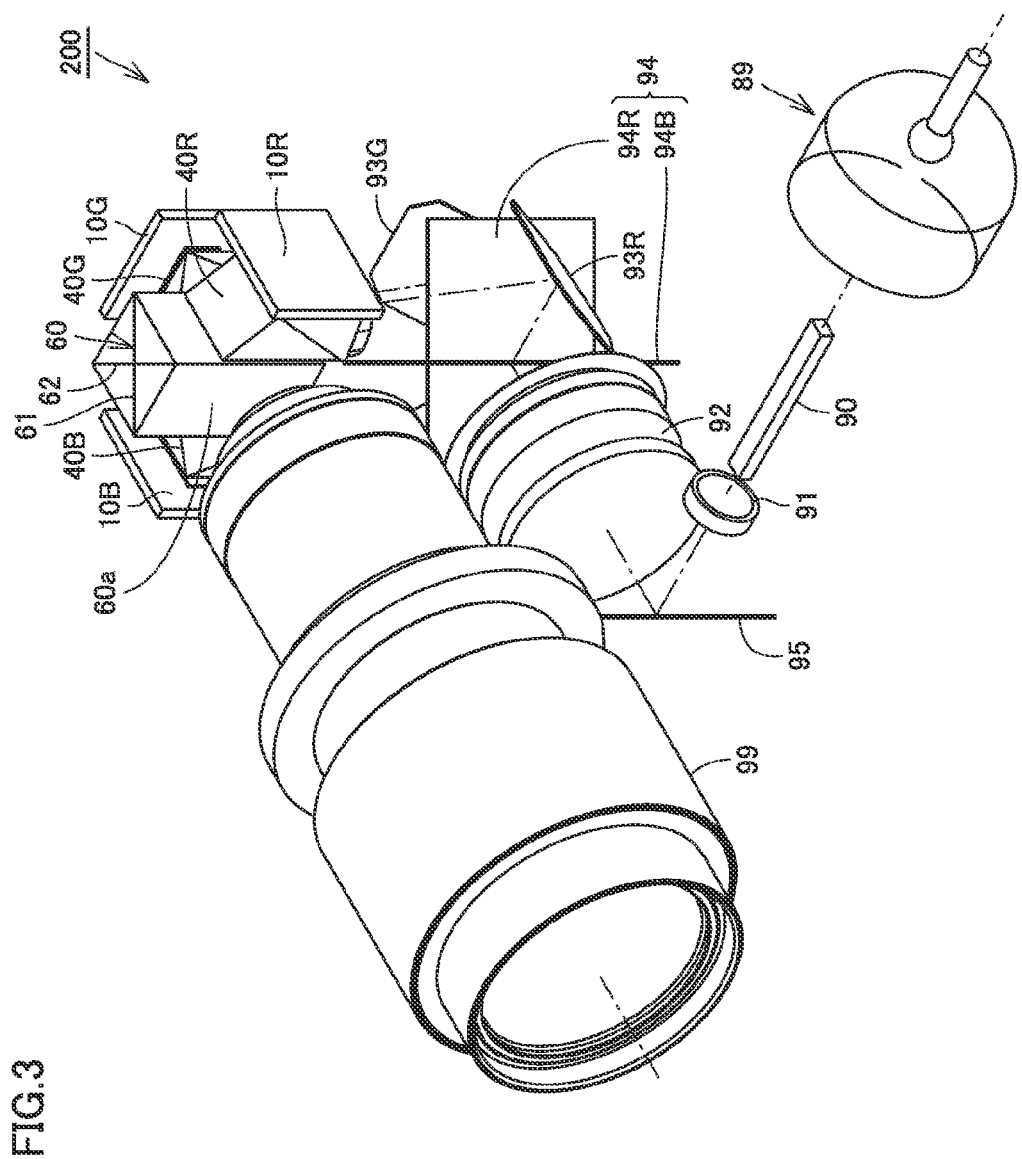
FIG. 3 is a schematic diagram showing an image projection apparatus in the first embodiment.

FIG. 3 is a schematic diagram showing an image projection apparatus in the present embodiment. FIG. 3 does not show some components such as holding member 20, reflection-type image display element holding plates 15R, 15G, 15B, and base member 50 for convenience sake. Referring to FIG. 3, an image projection apparatus 200 in the present embodiment will be described.

As shown in FIG. 3, image projection apparatus 200 in the present embodiment includes a light source unit 89, a rod integrator 90, relay lenses 91, 92, a relay mirror 95, a cross dichroic mirror 94, a red-reflective mirror 93R, a green-reflective mirror 93G, a blue-reflective mirror (not shown) 93B, an image projection unit 100, and a projection lens 99.

Light source unit 89 is a high-luminance white light source such as High-Intensity Discharge (HID) lamp or white LED (Light Emitting Diode), for example, and emits white light toward rod integrator 90.

Rod integrator 90 internally reflects the light entering from an incident portion and emits the reflected light from an emission portion in order to convert the light intensity distribution to a uniform light intensity distribution. A relay optical system includes the lenses and mirrors for directing the light from the emission portion of rod integrator 90 to digital mirror devices 10R, 10G, 10B.

The light emitted from rod integrator 90 is incident on cross dichroic mirror 94 via relay lens 91, relay mirror 95, and relay lens 92. Cross dichroic mirror 94 has a red light reflection dichroic mirror 94R and a blue light reflection dichroic mirror 94B.

Red light included in white light incident on cross dichroic mirror 94 is reflected by red light reflection dichroic mirror 94R toward red-reflective mirror 93R. The red light incident on red-reflective mirror 93R is reflected by red-reflective mirror 93R toward total reflection prism 40R.

Blue light included in the white light incident on cross dichroic mirror 94 is reflected by blue light reflection dichroic mirror 94B toward the blue-reflective mirror (not shown). The blue light incident on the blue-reflective mirror is reflected by the blue-reflective mirror toward total reflection prism 40B.

Green light included in the white light incident on cross dichroic mirror 94 is passed through red light reflection dichroic mirror 94R and blue light reflection dichroic mirror 94B and incident on green-reflective mirror 93G. After this, the light is reflected by green-reflective mirror 93G toward total reflection prism 40G.

Total reflection prisms 40R, 40B, 40G guide the red light, the blue light, and the green light reflected respectively from red-reflective mirror 93R, the blue-reflective mirror (not shown), and green-reflective mirror 93G to digital mirror devices 10R, 10G, 10B.

The respective color lights guided to digital mirror devices 10R, 10G, 10B are reflected, as the ON light and the OFF light depending on a desired image, by digital mirror devices 10R, 10G, 10B toward total reflection prisms 40R, 40G, 40B. Total reflection prisms 40R, 40G, 40B emit the OFF and ON lights of the colors reflected from digital mirror devices 10R, 10G, 10B toward color synthesis prism 60.

Color synthesis prism 60 has red light reflection surface 61 and blue light reflection surface 62. The red ON light entering color synthesis prism 60 is reflected by red light reflection surface 61 and emitted from emission surface 60a. The blue ON light entering color synthesis prism 60 is reflected by blue light reflection surface 62 and emitted from emission surface 60a. The green ON light entering color synthesis prism 60 is passed through red light reflection surface 61 and blue light reflection surface 62 and emitted from emission surface 60a. Thus, the red ON light, the blue ON light, and the green ON light are synthesized and emitted in the form of an image from emission surface 60a and projected through projection lens 99 on a screen.

Figure 4:
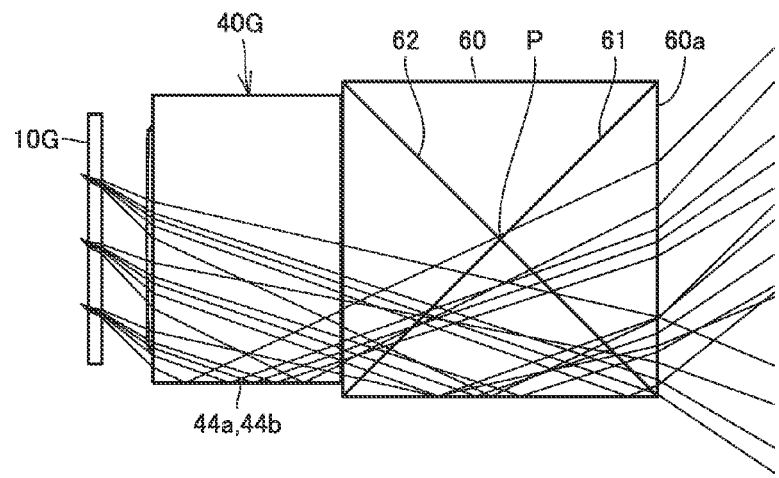
FIG. 4 is a top view of main components of the image projection unit shown in FIG. 1, showing respective paths of OFF lights reflected from a digital mirror device.
Figure 5:
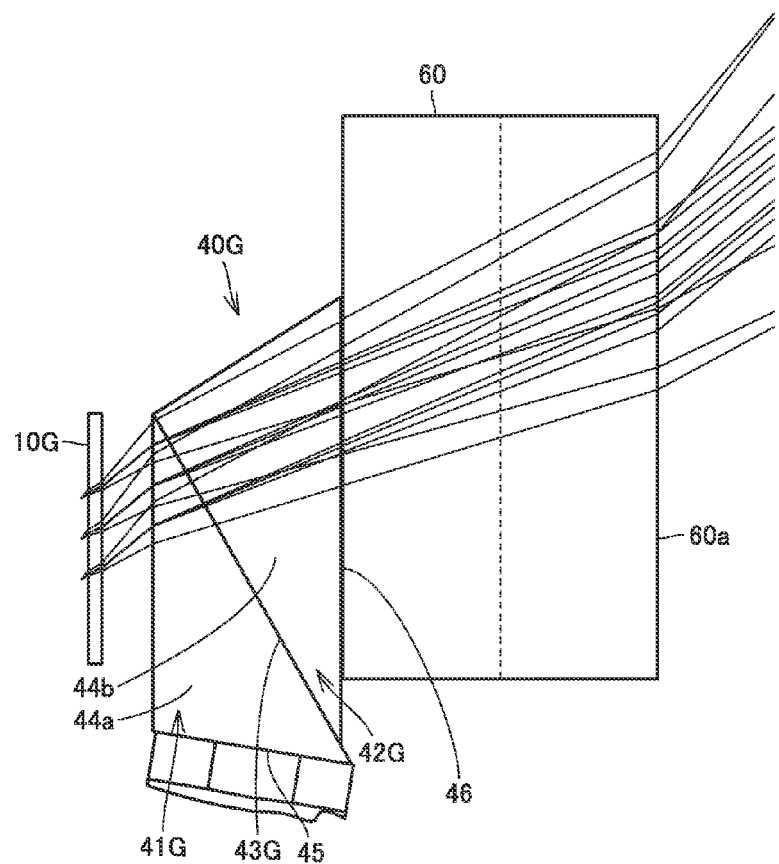
FIG. 5 is a side view of main components of the image projection unit shown in FIG. 1, showing respective paths of OFF lights reflected from a digital mirror device.
Figure 6:
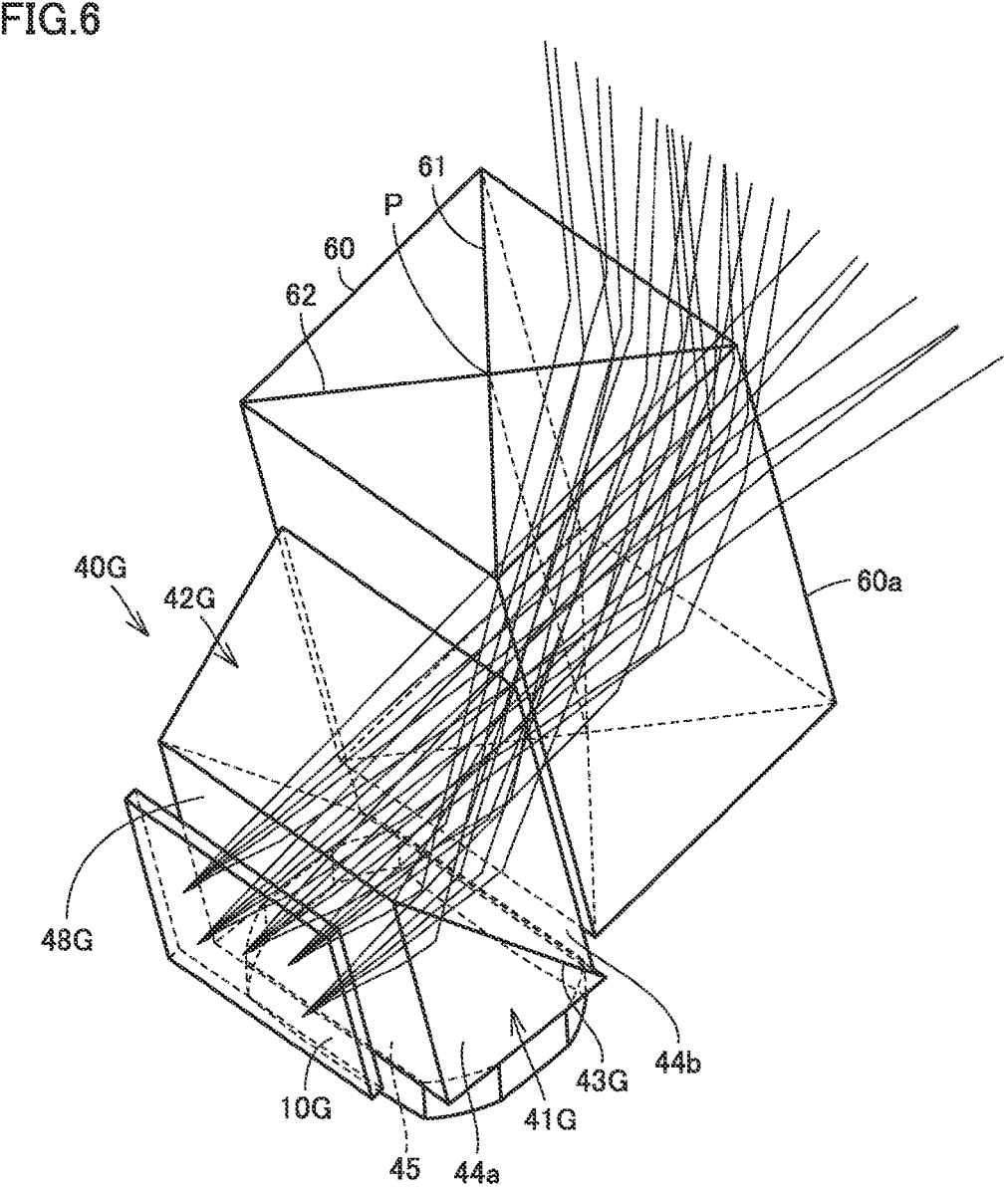
FIG. 6 is a perspective view of main components of the image projection unit shown in FIG. 1, showing respective paths of OFF lights reflected from a digital mirror device.

FIGS. 4, 5, and 6 are respectively a top view, a side view, and a perspective view of main components of the image projection unit shown in FIG. 1, showing respective paths of OFF lights reflected from a digital mirror device. With reference to FIGS. 4 to 6, a description will be given of paths of green OFF lights reflected from digital mirror device 10G as well as a detailed structure of total reflection prism 40G, referring particularly to total reflection prism 40G and color synthesis prism 60.

As shown in FIGS. 4 to 6, total reflection prism 40G includes a first prism 41G and a second prism 42G which are each substantially in the shape of a triangular prism, and an air gap layer 43G provided between respective oblique surfaces of first prism 41G and second prism 42G. Total reflection prism 40G includes a light incident surface 45, a total reflection surface 43, reflection surfaces 44a, 44b, and a light emission surface 46.

Light incident surface 45 is located at the bottom surface of first prism 41G, and light from a light source 89a enters through light incident surface 45. Total reflection surface 43 is located at the oblique surface of first prism 41G, and reflects light entering through light incident surface 45 toward digital mirror device 10G.

Reflection surfaces 44a, 44b are located at one of the side surfaces of first prism 41G and second prism 42G which are arranged in the direction crossing the direction in which digital mirror device 10G and color synthesis prism 60 are arranged. Reflection surfaces 44a, 44b reflect OFF light reflected from digital mirror device 10G toward color synthesis prism 60. Reflection surfaces 44a, 44b may be formed of a mirror-finished polished surface, or formed of a reflection film made of a metal member or the like which is vapor-deposited on one of the side surfaces of first prism 41G and second prism 42G.

Instead of reflection surfaces 44a, 44b, a light absorbing surface may be formed by providing a light absorbing member on one of the side surfaces of first prism 41G and second prism 42G. As the light absorbing member, a light absorbing film on which a black coating agent is applied to form the light absorbing film may be used. The light absorbing film is formed for example by adding a black pigment to acrylic resin fine particles, applying the black coating agent dispersed in water to one of the side surfaces of first prism 41G and second prism 42G, and drying the applied black coating agent. The light absorbing film absorbs color light entering the light absorbing film. To the other side surface of first prism 41G and second prism 42G, the above-described prism holding member 70 is attached.

Light emission surface 46 is located at the surface of second prism 42G facing the color synthesis prism, and emits OFF light and ON light reflected from digital mirror device 10G toward color synthesis prism 60.

The OFF light reflected from digital mirror device 10R enters first prism 41G. A part of the OFF light entering first prism 41G is reflected by reflection surface 44a and emitted from light emission surface 46 toward color synthesis prism 60. In contrast, the remaining part of the OFF light entering first prism 41G enters second prism 42.

A part of the OFF light entering second prism 42 is reflected by reflection surface 44b and emitted from light emission surface 46 toward color synthesis prism 60. The remaining part of the OFF light entering second prism 42 is emitted from light emission surface 46 toward color synthesis prism 60.

These OFF lights emitted toward color synthesis prism 60 are reflected in color synthesis prism 60 or transmitted through color synthesis prism 60 and emitted from emission surface 60a. At this time, the OFF lights are emitted from emission surface 60a so that the OFF lights are not mixed with the ON light.

In the case where the light absorbing surface is formed, a part of the OFF light entering first prism 41G is absorbed by the light absorbing surface. Meanwhile, a part of the remaining part of the OFF light entering first prism 41G is absorbed by the light absorbing surface in second prism 42G. The OFF light which has not been absorbed by the light absorbing surface of first prism 41G and the light absorbing surface of second prism 42G is reflected in color synthesis prism 60 or transmitted through color synthesis prism 60 and emitted from emission surface 60a.

Thus, the light reflection surface or light absorbing surface can be provided to prevent the OFF light from being transmitted through total reflection prisms 40R, 40G, 40B and reflected by other members in unintended directions. Thus, mixture of the ON light emitted from emission surface 60a and the OFF light can be prevented. Consequently, stray light which is one of factors deteriorating the projection quality can be reduced and a high-contrast image can be projected.

As seen from the above, in image projection unit 100 and image projection apparatus 200 in the present embodiment, holding member 20 holds digital mirror devices 10R, 10G, 10B so that no load is exerted on total reflection prisms 40R, 40G, 40B, and therefore, registration deviation is less likely to occur.

Second Embodiment

Figure 7:
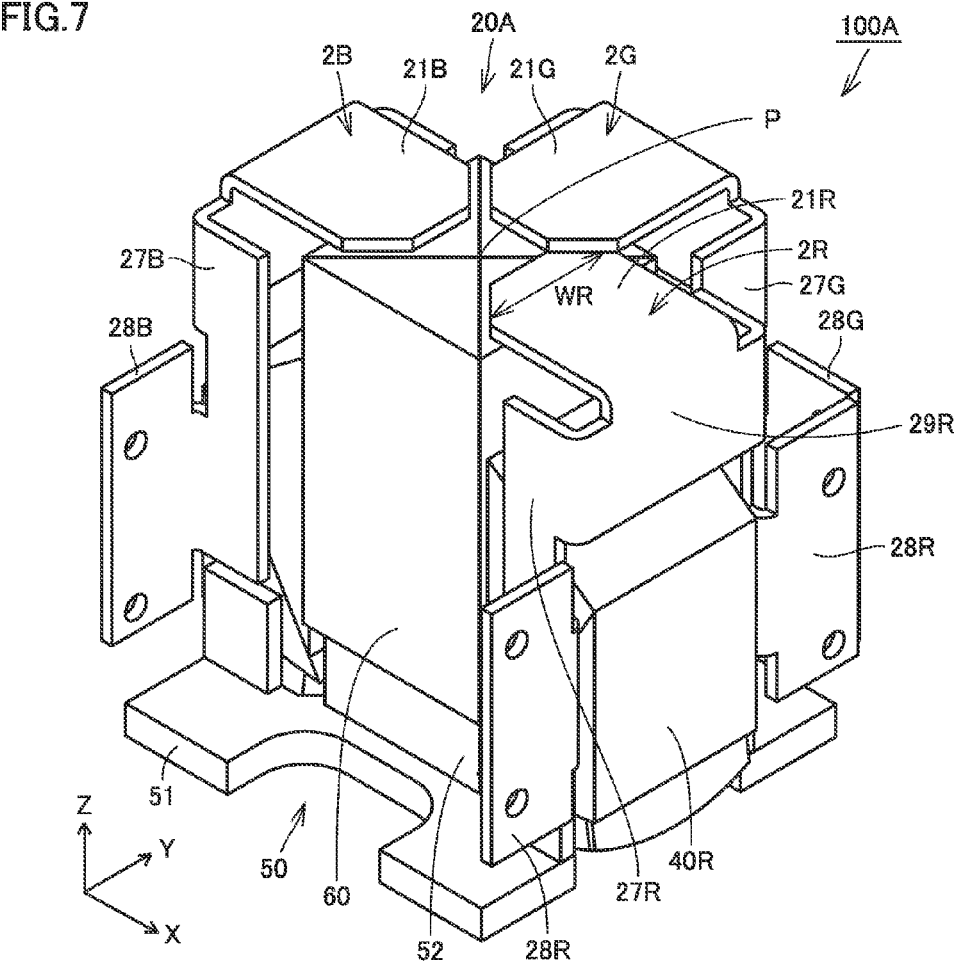
FIG. 7 is a schematic diagram of an image projection unit in a second embodiment.

FIG. 7 is a schematic diagram of an image projection unit in the present embodiment. In FIG. 7, digital mirror devices 10R, 10G, 10B in the first embodiment are not shown for convenience sake. Referring to FIG. 7, an image projection unit 100A in the present embodiment will be described.

As shown in FIG. 7, image projection unit 100A in the present embodiment differs from image projection unit 100 in the first embodiment in terms of the structure of a holding member 20A. Other features of image projection unit 100A are substantially similar to those of the image projection unit in the first embodiment.

Holding member 20A includes a plurality of holding bodies 2R, 2G, 2B provided respectively for a plurality of digital mirror devices 10R, 10G, 10B. A plurality of holding bodies 2R, 2G, 2B all have the same shape. A plurality of holding bodies 2R, 2G, 2B are each fixed by bonding to color synthesis prism 60.

Figure 8:
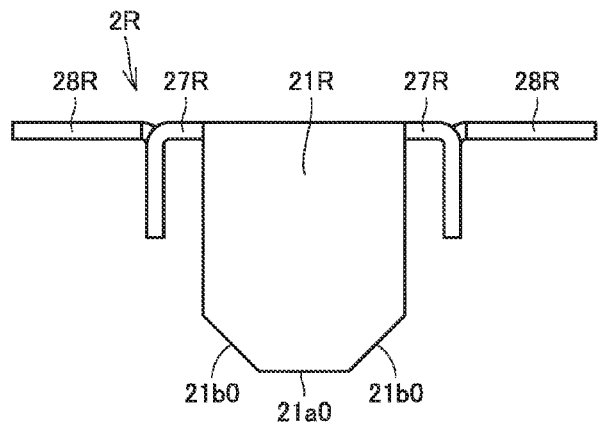
FIG. 8 is a top view of a holding member shown in FIG. 7.
Figure 9:
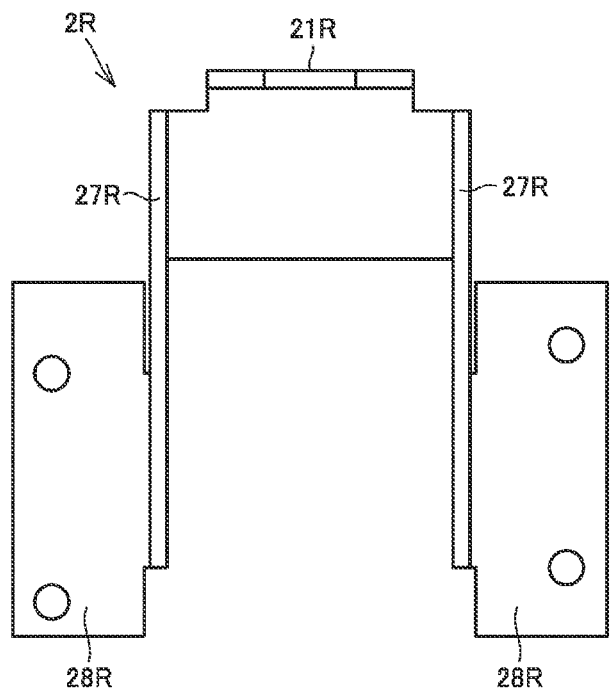
FIG. 9 is a front view of the holding member shown in FIG. 7.
Figure 10:
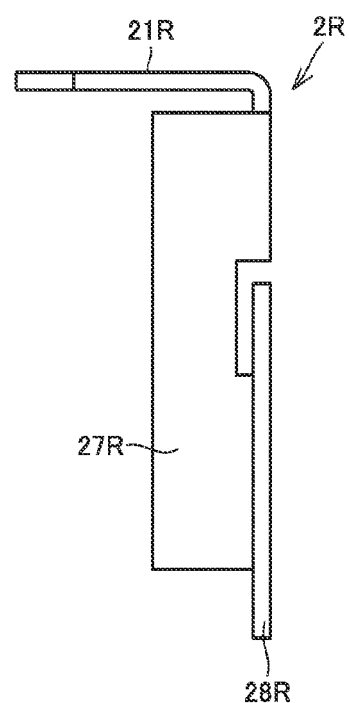
FIG. 10 is a side view of the holding member shown in FIG. 7.

FIGS. 8, 9, and 10 are respectively a top view, a front view, and a side view of the holding member shown in FIG. 7. In FIGS. 8 to 10, one holding body 2R among a plurality of holding bodies included in holding member 20A is shown. Referring to FIGS. 7 to 10, particularly the shape of holding body 2R will be described.

As shown in FIGS. 7 to 10, holding body 2R includes a top plate 21R, side plates 27R, a connecting part 29R, and reflection-type image display element holding parts 28R. Top plate 21R is provided to cover a part of the top surface of only the triangular prism which is one of the four triangular prisms constituting color synthesis prism 60 and which faces total reflection prism 40R. Moreover, top plate 21R protrudes from the side which is opposite to center P of color synthesis prism 60 as seen from above, in the direction away from center P (in the X-axis direction).

Top plate 21R has a leading end located opposite to center P of total reflection prism 40R. The leading end has a shape with its width WR decreasing toward center P. Specifically, the leading end includes a side 21a0 and sides 21b0. Side 21a0 is provided substantially in parallel with the base of the top surface of the triangular prism which faces total reflection prism 40R. The base is a side opposite to center P of color synthesis prism 60. Sides 21b0 are located laterally to the respective two opposite ends of side 21a0, and provided substantially in parallel with the oblique sides of the top surface of the triangular prism which faces total reflection prism 40R.

Side plates 27R are provided to face respective two opposite side surfaces of total reflection prism 40R which are arranged in the direction crossing the direction in which color synthesis prism 60 and total reflection prism 40R are arranged. Connecting part 29R connects top plate 21R to side plates 27R. Connecting part 29R is located above total reflection prism 40R.

Reflection-type image display element holding part 28R has a shape of a plate. Reflection-type image display element holding part 28R protrudes away from total reflection prism 40R, from a portion of side plate 27R located lower than connecting part 29R. Thus, reflection-type image display element holding part 28R is provided not to interfere with optical paths formed between digital mirror device 10R and total reflection prism 40R. To reflection-type image display element holding part 28R, digital mirror device 10R is attached with a fastening member and/or an adhesive.

Holding body 2G and holding body 2B are also configured conformably to holding body 2R as described above. Holding body 2G includes a top plate 21G, side plates 27G, a connecting part 29G, and reflection-type image display element holding parts 28G. Holding body 2B includes a top plate 21B, side plates 27B, a connecting part 29B, and reflection-type image display element holding parts 28B.

In the case where holding member 20A is configured in the above-described manner as well, holding bodies 2R, 2G, 2B hold corresponding digital mirror devices 10R, 10G, 10B so that no load is exerted on total reflection prisms 40R, 40G, 40B in image projection unit 100A in the present embodiment, and therefore, registration deviation is less likely to occur. Moreover, since holding bodies 2R, 2G, 2B have the same shape, the common members can be used and thus the cost for the members can be reduced.

Third Embodiment

Figure 11:
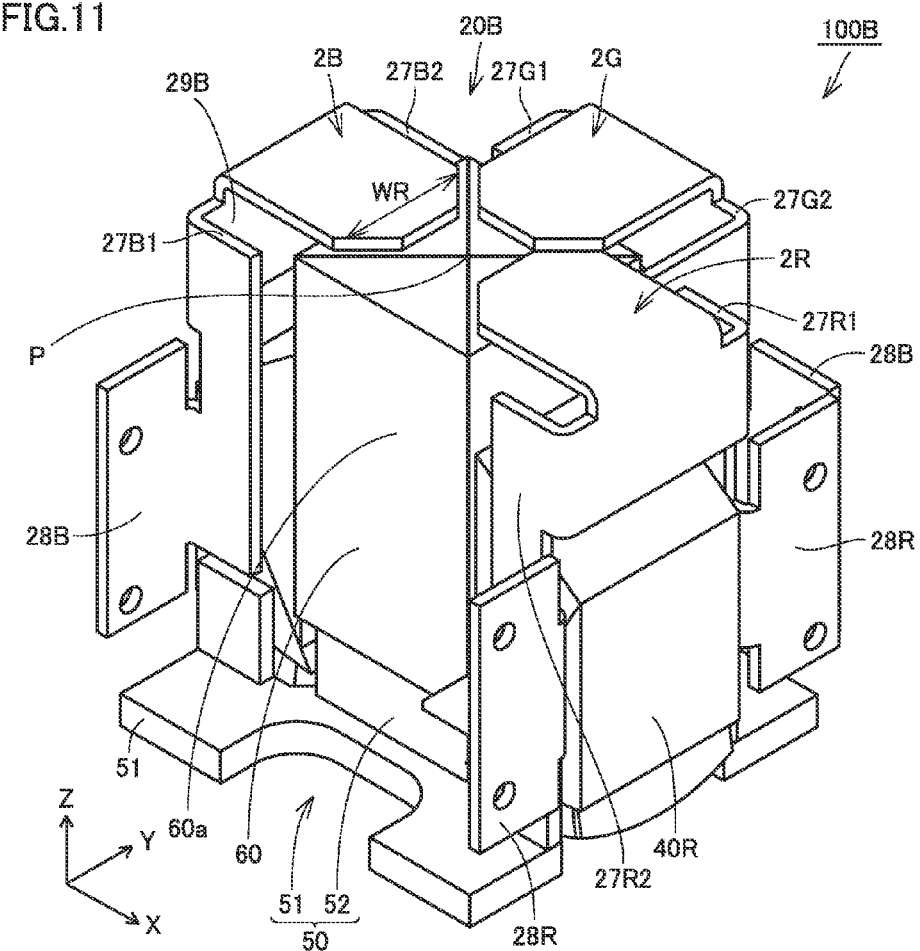
FIG. 11 is a schematic diagram of an image projection unit in a third embodiment.

FIG. 11 is a schematic diagram of an image projection unit in the present embodiment. In FIG. 11, digital mirror devices 10R, 10G, 10B in the first embodiment are not shown for convenience sake. Referring to FIG. 11, an image projection unit 100B in the present embodiment will be described.

As shown in FIG. 11, image projection unit 100B in the present embodiment differs from image projection unit 100 in the second embodiment in terms of the structure of a holding member 20B. Other features of image projection unit 100B are substantially similar to those of the image projection unit in the second embodiment.

Holding member 20B includes a plurality of holding bodies 2R, 2G, 2B. At least one of a plurality of holding bodies 2R, 2G, 2B differs in shape from the other holding bodies. Specifically, holding bodies 2G, 2B among a plurality of holding bodies 2R, 2G, 2B have the same shape, and the shape of holding body 2R differs from the shape of holding bodies 2G, 2B.

Figure 12:
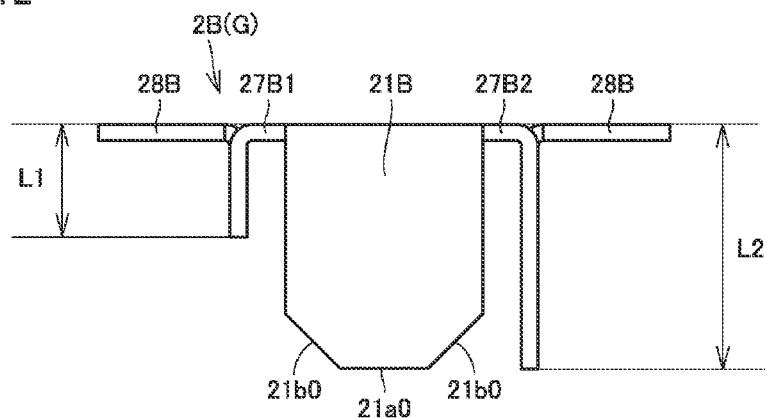
FIG. 12 is a diagram showing an example of the top view of a holding body included in a holding member shown in FIG. 11.
Figure 13:
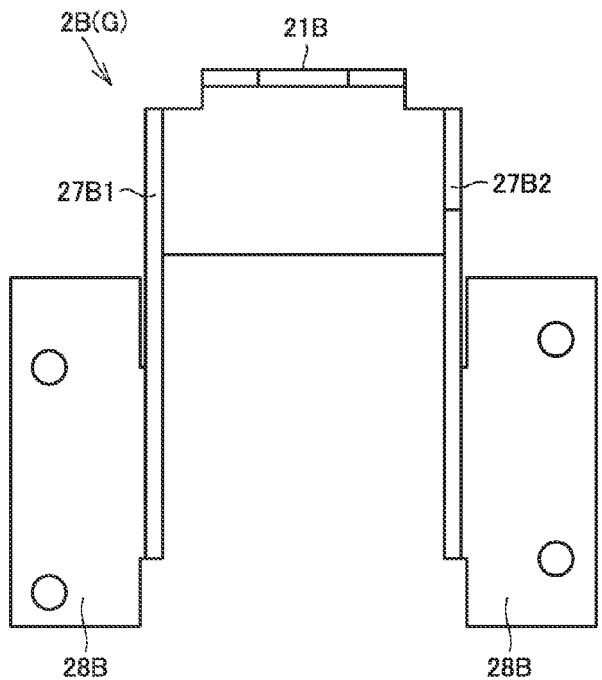
FIG. 13 is a diagram showing an example of the front view of the holding body included in the holding member shown in FIG. 11.
Figure 14:
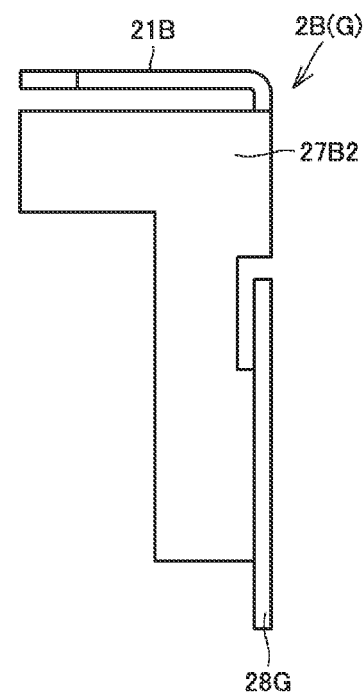
FIG. 14 is a diagram showing an example of the side view of the holding body included in the holding member shown in FIG. 11.

FIGS. 12, 13, and 14 are respectively a top view, a front view, and a side view of a holding body included in the holding member shown in FIG. 11. In FIGS. 12 to 14, the top view, the front view, and the side view of holding bodies 2B, 2G are shown respectively. Referring to FIGS. 11 to 14, the shape of holding body 2B will be described.

Holding body 2B includes a top plate 21B, side plates 27B1, 27B2, a connecting part 29B, and reflection-type image display element holding parts 28B. Top plate 21B is provided to cover a part of the top surface of the triangular prism which is one of the four triangular prisms constituting color synthesis prism 60 and which faces total reflection prism 40B. Moreover, top plate 21B protrudes from the side which is opposite to the vertex of the aforementioned triangular prism as seen from above, in the direction away from the vertex (in the negative X-axis direction). Like the top plate in the second embodiment, top plate 21B has a side 21a0 and sides 21b0, and has a shape with its width WB decreasing toward center P of the total reflection prism.

Side plates 27B 1, 27B2 are provided to face respective two opposite side surfaces of total reflection prism 40B which are arranged in the direction crossing the direction in which color synthesis prism 60 and total reflection prism 40B are arranged. Side plate 27B1 is provided to face the side surface of total reflection prism 40B that is located on the same side as emission surface 60a of color synthesis prism 60. Side plate 27B2 is provided to face the side surface of total reflection prism 40B that is located on the opposite side to emission surface 60a of color synthesis prism 60.

Length L1 of side plate 27B 1 is designed to be shorter than length L2 of side plate 27B2. Thus, side plate 27B1 is located further away from emission surface 60a of color synthesis prism 60, to prevent interference between OFF light and ON light emitted from emission surface 60a and side plate 27B1. Moreover, side plate 27B2 is bonded to a side surface of color synthesis prism 60 so as not to hinder passage of the OFF light and ON light. Thus, color synthesis prism 60 can be held stably. Connecting part 29B connects top plate 21B to side plates 27B1, 27B2. Connecting part 29B is provided above total reflection prism 40B.

Reflection-type image display element holding parts 28B have a shape of a plate. Reflection-type image display element holding parts 28B protrude away from total reflection prism 40B, from respective portions of side plate 27B1, 27B2 located lower than connecting part 29B. Thus, reflection-type image display element holding parts 28B are provided not to interfere with optical paths formed between digital mirror device 10B and total reflection prism 40B. To reflection-type image display element holding parts 28B, digital mirror device 10B is attached with a fastening member and/or an adhesive.

Holding body 2G is also configured conformably to holding body 2B, and includes a top plate 21G, side plates 27G1, 27G2, a connecting part 29G, and reflection-type image display element holding parts 28G.

Figure 15:
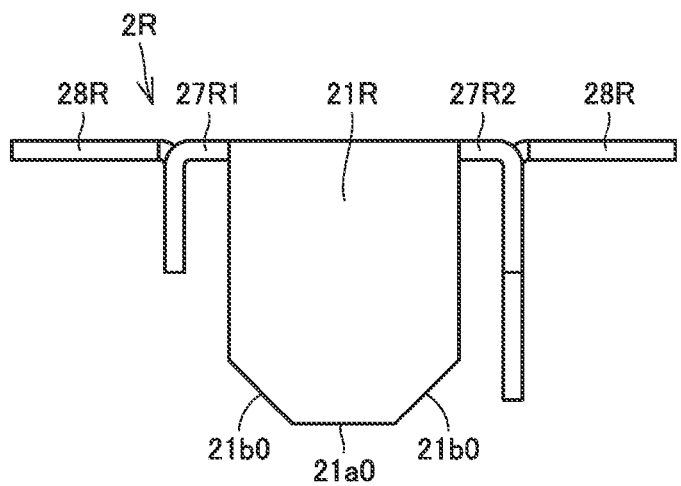
FIG. 15 is a diagram showing another example of the top view of the holding body included in the holding member shown in FIG. 11.
Figure 16:
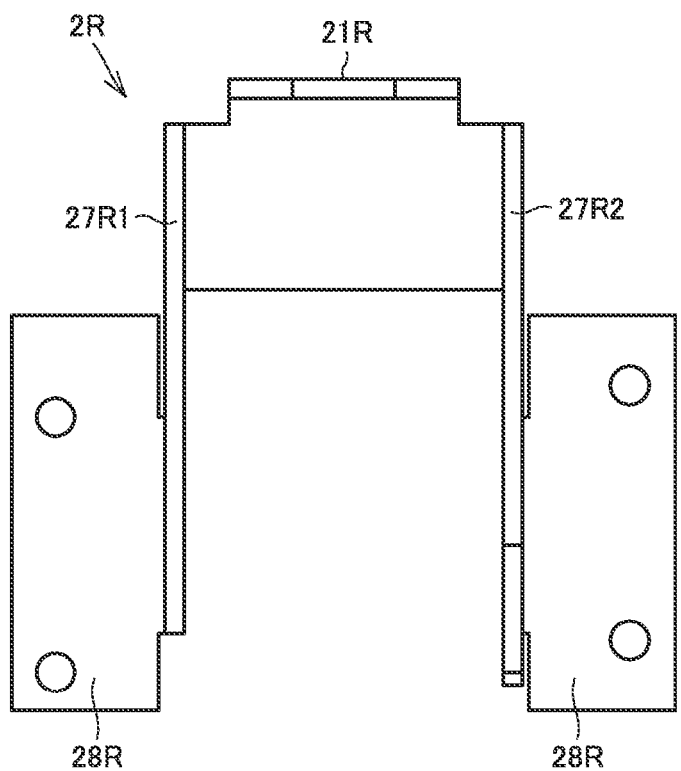
FIG. 16 is a diagram showing another example of the front view of the holding body included in the holding member shown in FIG. 11.
Figure 17:
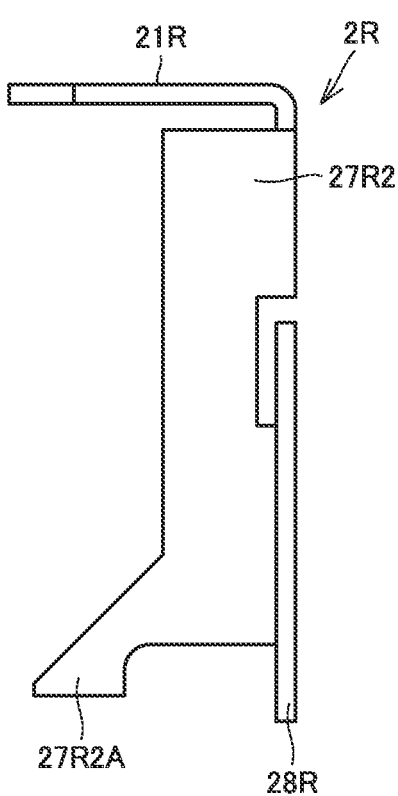
FIG. 17 is a diagram showing another example of the side view of the holding body included in the holding member shown in FIG. 11.

FIGS. 15, 16, and 17 are respectively another example of the top view, another example of the front view, and another example of the side view of the holding body included in the holding member shown in FIG. 11. In FIGS. 15 to 17, the top view, the front view, and the side view of holding body 2R are shown respectively. Referring to FIGS. 15 to 17, the shape of holding body 2R will be described.

Holding body 2R is configured substantially conformably to holding body 2B, and includes a top plate 21R, side plates 27R1, 27R2, and reflection-type image display element holding parts 28R. Holding body 2R differs from holding body 2B in terms of the shape of side plate 27R2.

Side plate 27R2 includes a protruding part 27R2A. At the lower end of side plate 27R2 that is located at a lateral side of color synthesis prism 60 (at the base member 50—side end of side plate 27R2), protruding part 27R2A is inclined toward color synthesis prism 60 as it approaches base member 50. Moreover, protruding part 27R2A is bonded to a lower portion of the side surface of color synthesis prism 60 so as not to hinder the passage of ON light and OFF light. Thus, color synthesis prism 60 is more stably held.

In the case where holding member 20B is configured in the above-described manner as well, holding bodies 2R, 2G, 2B hold corresponding digital mirror devices 10R, 10G, 10B so that no load is exerted on total reflection prisms 40R, 40G, 40B in image projection unit 100B in the present embodiment, and therefore, registration deviation is less likely to occur. Moreover, since at least one of holding bodies 2R, 2G, 2B differs in shape from the other holding bodies, an error in positional arrangement of constituent members can be prevented when assembled.

Fourth Embodiment

Figure 18:
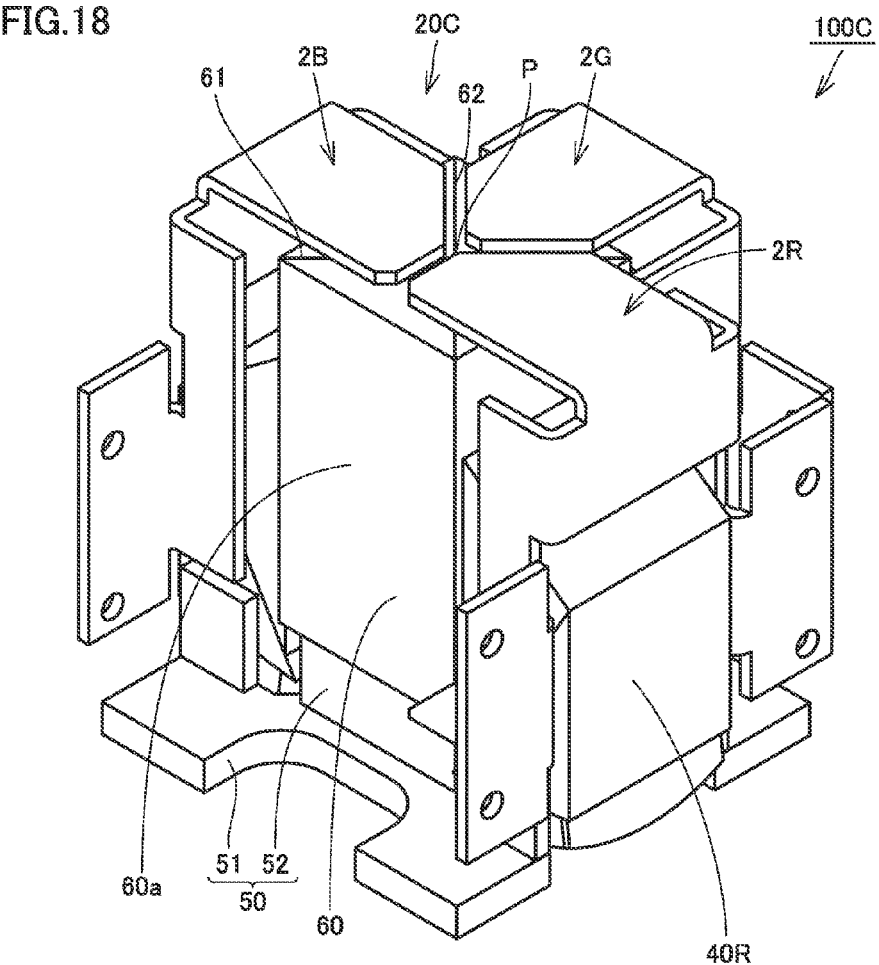
FIG. 18 is a schematic diagram of an image projection unit in a fourth embodiment.

FIG. 18 is a schematic diagram of an image projection unit in the present embodiment. In FIG. 18, digital mirror devices 10R, 10G, 10B in the first embodiment are not shown for convenience sake. Referring to FIG. 18, an image projection unit 100C in the present embodiment will be described.

As shown in FIG. 18, image projection unit 100C in the present embodiment differs from image projection unit 100B in the second embodiment in terms of the structure of a holding member 20C. Other features of image projection unit 100C are substantially similar to those of image projection unit 100B.

Holding member 20C includes a plurality of holding bodies 2R, 2G, 2B. A plurality of holding bodies 2R, 2G, 2B are different in shape from one another.

Figure 19:
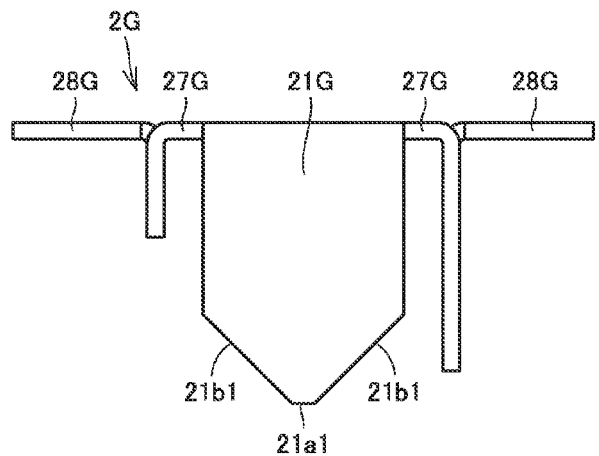
FIG. 19 is a diagram showing a first example of the top view of a holding body included in a holding member shown in FIG. 18.
Figure 20:
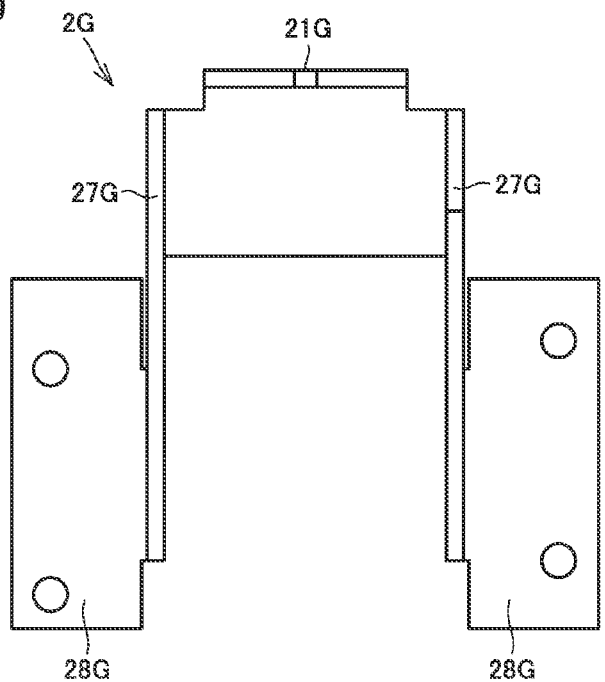
FIG. 20 is a diagram showing a first example of the front view of the holding body included in the holding member shown in FIG. 18.
Figure 21:
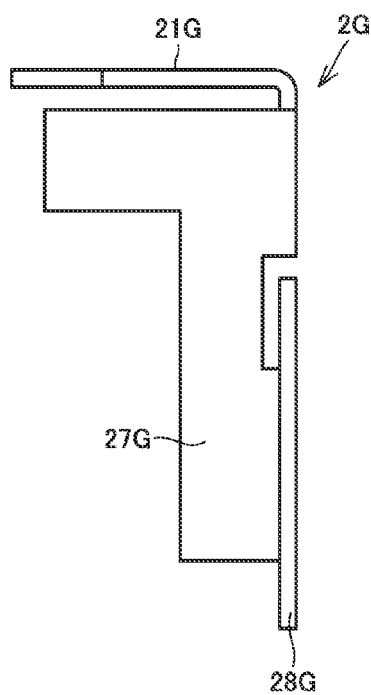
FIG. 21 is a diagram showing a first example of the side view of the holding body included in the holding member shown in FIG. 18.

FIGS. 19, 20, and 21 are respectively first examples of the top view, the front view, and the side view of the holding body included in the holding member shown in FIG. 18. In FIGS. 19 to 21, the top view, the front view, and the side view of holding body 2G are shown respectively. Referring to FIGS. 18 to 21, the shape of holding body 2G will be described.

Holding body 2G slightly differs from holding body 2G in the third embodiment in terms of the shape of top plate 21G. Specifically, a side 21a1 of top plate 21G in the present embodiment is disposed closer to center P of color synthesis prism 60, relative to side 21*a* of top plate 21G in the third embodiment. Therefore, side 21*a*1 of top plate 21G is shorter than side 21*a* of top plate 21G in the third embodiment, and side 21*b*1 of top plate 21G is longer than side 21*b* of top plate 21G in the third embodiment.

Figure 22:
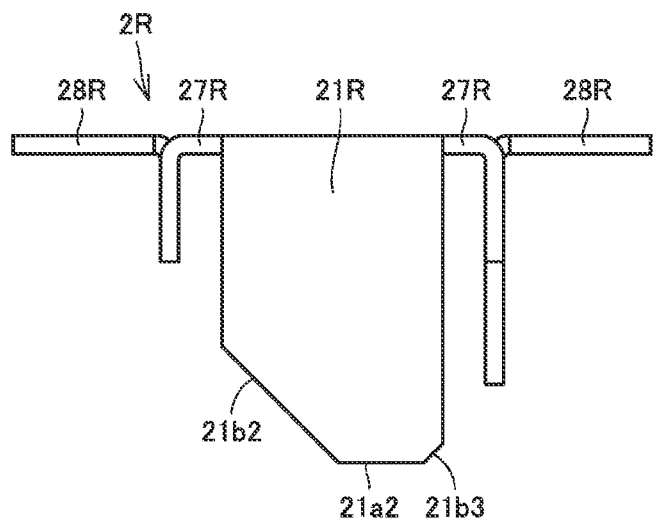
FIG. 22 is a diagram showing a second example of the top view of the holding body included in the holding member shown in FIG. 18.
Figure 23:
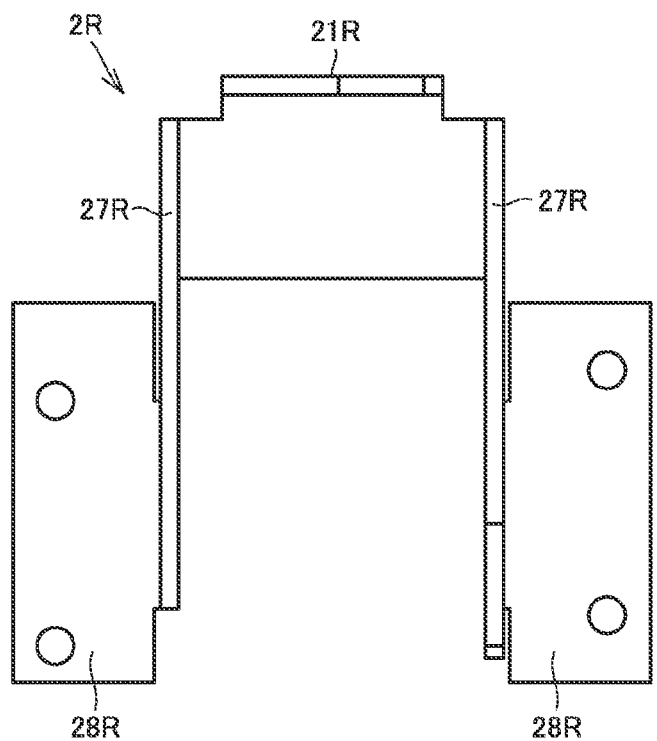
FIG. 23 is a diagram showing a second example of the front view of the holding body included in the holding member shown in FIG. 18.
Figure 24:
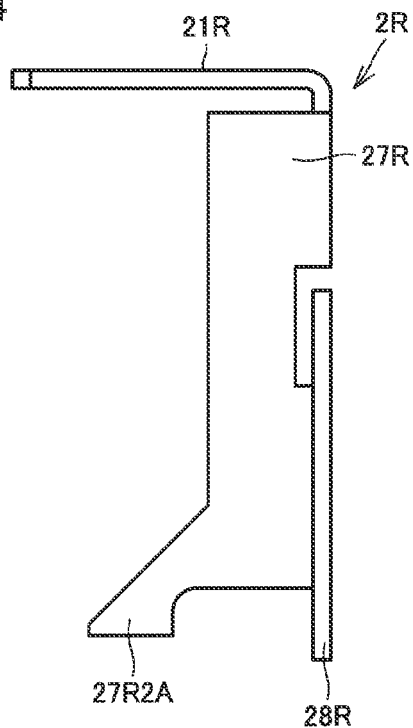
FIG. 24 is a diagram showing a second example of the side view of the holding body included in the holding member shown in FIG. 18.

FIGS. 22, 23, and 24 are respectively second examples of the top view, the front view, and the side view of the holding body included in the holding member shown in FIG. 18. In FIGS. 22 to 24, the top view, the front view, and the side view of holding body 2R are shown respectively. Referring to FIG. 18 and FIGS. 22 to 24, the shape of holding body 2R will be described.

Holding body 2R differs from holding body 2R in the third embodiment in terms of the shape of top plate 21R. Specifically, top plate 21R in the present embodiment is provided to cover the top surface of the triangular prism which faces total reflection prism 40R and a part of the top surface of the triangular prism which has emission surface 60*a*.

More specifically, a side 21*b*2 of top plate 21R extends to a position near center P of color synthesis prism 60, along the oblique side (red light reflection surface 61) of the top surface of the triangular prism which faces total reflection prism 40R. A side 21*b*2 of top plate R extends toward emission surface 60*a* from the end of side 21*b*2 that is located near aforementioned center P. A side 21*b*3 is designed to be shorter than side 21*b*2.

Figure 25:
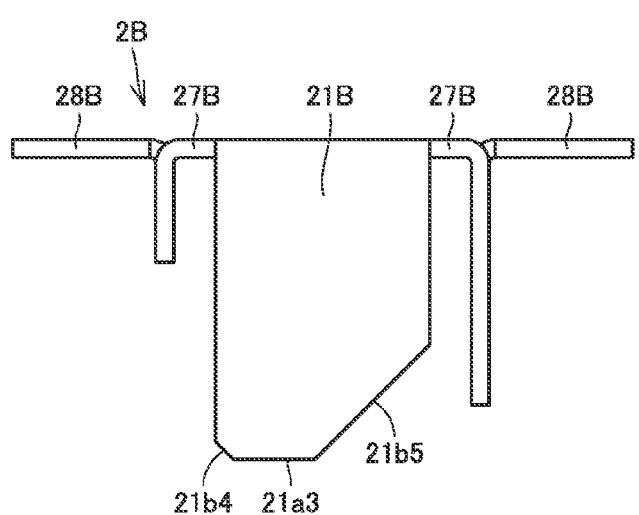
FIG. 25 is a diagram showing a third example of the top view of the holding body included in the holding member shown in FIG. 18.
Figure 26:
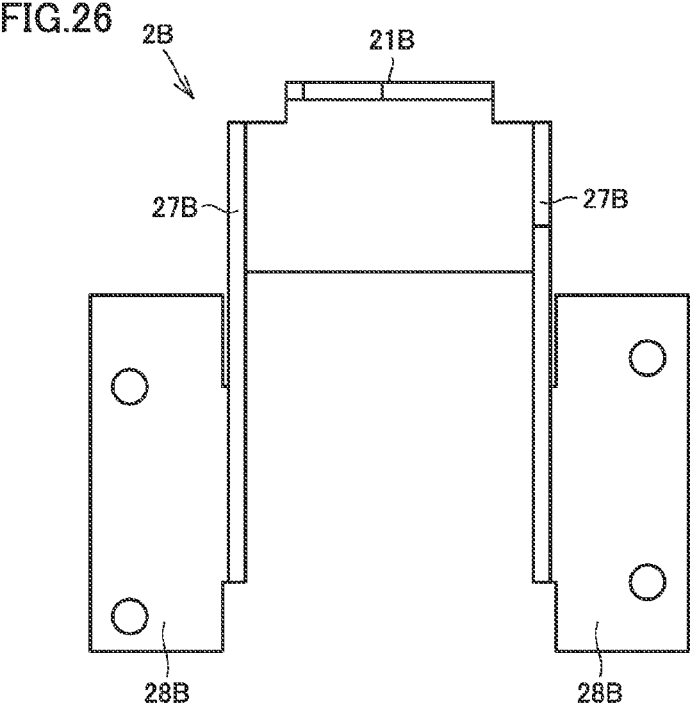
FIG. 26 is a diagram showing a third example of the front view of the holding body included in the holding member shown in FIG. 18.
Figure 27:
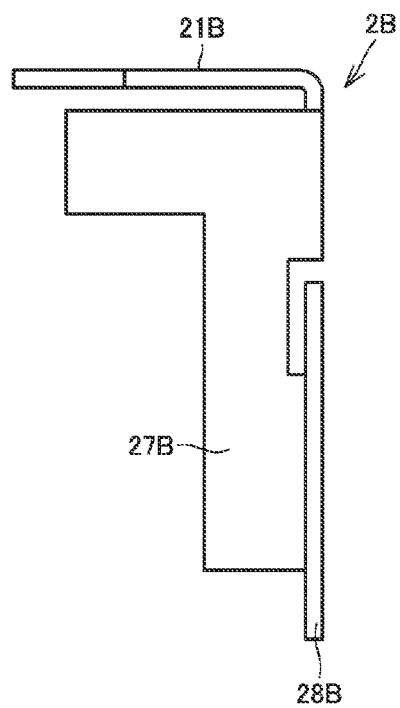
FIG. 27 is a diagram showing a third example of the side view of the holding body included in the holding member shown in FIG. 18.

FIGS. 25, 26, and 27 are respectively third examples of the top view, the front view, and the side view of the holding body included in the holding member shown in FIG. 18. In FIGS. 25 to 27, the top view, the front view, and the side view of holding body 2B are shown respectively. Referring to FIG. 18 and FIGS. 25 to 27, the shape of holding body 2B will be described.

Holding body 2B differs from holding body 2B in the third embodiment in terms of the shape of top plate 21B. Specifically, top plate 21B in the present embodiment is provided to cover the top surface of the triangular prism which faces total reflection prism 40G and a part of the top surface of the triangular prism which has emission surface 60*a*.

More specifically, a side 21*b*5 of top plate 21B extends to a position near center P of color synthesis prism 60, along the oblique side (blue light reflection surface 62) of the top surface of the triangular prism which faces total reflection prism 40B. A side 21*b*3 of top plate R extends toward emission surface 60*a* from the end of side 21*b*5 that is located near aforementioned center P. A side 21*b*4 is designed to be shorter than side 21*b*5.

In the case where holding member 20B is configured in the above-described manner as well, holding bodies 2R, 2G, 2B hold corresponding digital mirror devices 10R, 10G, 10B so that no load is exerted on total reflection prisms 40R, 40G, 40B in image projection unit 100B in the present embodiment, and therefore, registration deviation is less likely to occur. Moreover, since holding bodies 2R, 2G, 2B all differ in shape from each other, an error in positional arrangement of constituent members can be prevented when assembled. Further, since holding bodies 2R, 2G, 2B all differ in shape from each other, the region for bonding to color synthesis prism 60 can be optimized for each color. In this case, each holding body is disposed not to hinder the passage of ON light and OFF light.

Fifth Embodiment

Figure 28:
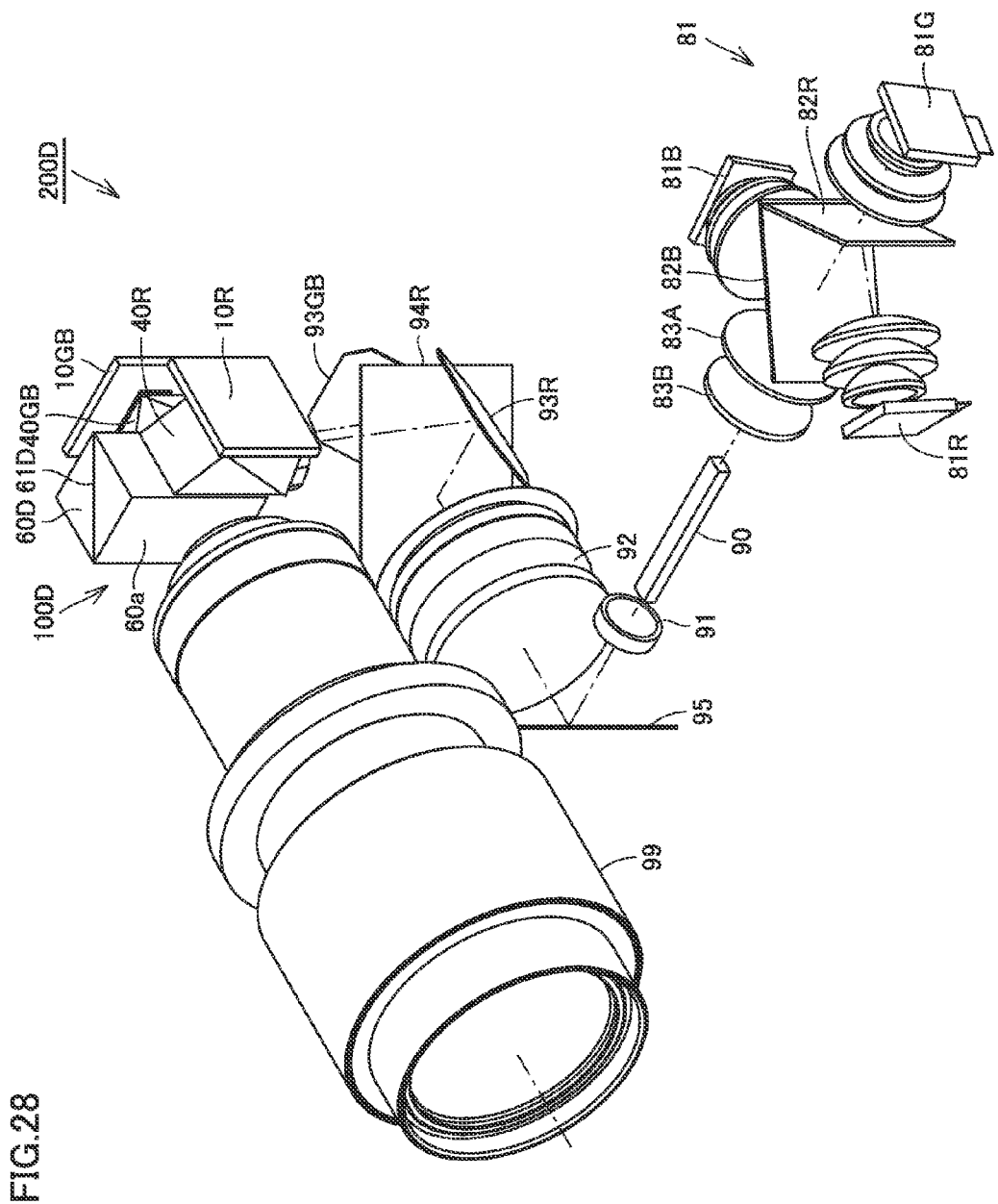
FIG. 28 is a schematic diagram showing an image projection apparatus in a fifth embodiment.

FIG. 28 is a schematic diagram showing an image projection apparatus in the present embodiment. Referring to FIG. 28, an image projection apparatus 200D in the present embodiment will be described.

As shown in FIG. 28, image projection apparatus 200D in the present embodiment differs from image projection apparatus 200 in the first embodiment in terms of the structure of an image projection unit 100D, the structure of a light source unit 81, and the structure of an optical system for directing light from the light source unit to a total reflection prism. Other features are substantially similar to those of the image projection apparatus in the first embodiment.

Image projection unit 100D in the present embodiment differs from image projection unit 100 in the first embodiment in terms of the number of reflection-type image display elements, the number of total reflection prisms, and the structure of the color synthesis prism.

Image projection unit 100D includes two digital mirror devices 10R, 10 GB as well as two total reflection prisms 40R, 40GB, and synthesizes, by a color synthesis prism 60D, lights of two colors into which the light emitted from light source unit 81 described later herein has been split. Color synthesis prism 60D and two total reflection prisms 40R, 40GR are fixed to a base member similarly to the first embodiment. Two total reflection prisms 40R, 40 GB are supported by a supporting member (not shown) similarly to the first to fourth embodiments.

Color synthesis prism 60D is made up of a combination of two triangular prisms, and includes a red light reflection dichroic mirror. Color synthesis prism 60D has a red light reflection surface 61D.

Light source unit 81 in the present embodiment includes a red light source 81R, a green light source 81G, a blue light source 81B, a red light reflection dichroic mirror 82R, and a blue light reflection dichroic mirror 82B. For each of red light source 81R, green light source 81G, and blue light source 81B, an LED light source, an LD (Laser Diode), or the like may be used.

Red light emitted from red light source 81R is reflected by red light reflection dichroic mirror 82R toward a rod integrator 90. The reflected red light is passed through blue light reflection dichroic mirror 82B, converged by collimator lenses 83A, 83B, and enters rod integrator 90.

Green light emitted from green light source 81G is passed through red light reflection dichroic mirror 82R and blue light reflection dichroic mirror 82B. The green light passed through these mirrors is converged by collimator lenses 83A, 83B and enters rod integrator 90.

Blue light emitted from blue light source 81B is reflected by blue light reflection dichroic mirror 82B toward rod integrator 90. The reflected blue light is passed through blue light reflection dichroic mirror 82B, converged by collimator lenses 83A, 83B, and enters rod integrator 90.

Blue light source 81B and green light source 81G undergo time-sharing control so that respective lights separately enter rod integrator 90. Thus, lights of a plurality of colors emitted from light source unit 81 are separated into lights of two colors.

The light entering rod integrator 90 is subjected to total reflection appropriately from the side surfaces of rod integrator 90 and emitted. A light beam emitted from rod integrator 90 is incident on red light reflection dichroic mirror 94R via a relay lens 91, a relay mirror 95, and a relay lens 92.

The red light incident on red light reflection dichroic mirror 94R is reflected by red light reflection dichroic mirror 94R toward red light reflection mirror 93R. The red light incident on red light reflection mirror 93R is reflected by red light reflection mirror 93R toward total reflection prism 40R.

The red light reflected toward total reflection prism 40R is guided by digital mirror device 10R. The red light reflected from digital mirror device 10R is directed toward color synthesis prism 60D. The red light entering color synthesis prism 60D is reflected from red light reflection surface 61D to be emitted from an emission surface 60a toward a projection lens 99.

In contrast, the blue light or green light incident on red light reflection dichroic mirror 94R is passed through red light reflection dichroic mirror 94R, and reflected by reflection mirror 93 GB toward total reflection prism 40 GB.

The green light or blue light reflected toward total reflection prism 40 GB is guided to digital mirror device 10 GB. The green light or blue light reflected from digital mirror device 10 GB is passed through red light reflection surface 61D to be emitted from emission surface 60a toward projection lens 99.

The red light and the green light or blue light as described above are synthesized by color synthesis prism 60D. The light in the synthesized state is then emitted from emission surface 60a and projected on a screen through the projection lens.

While the present embodiment is described above by way of example in connection with the case where light source unit 81 includes a plurality of light sources and a plurality of dichroic mirrors, this is not a limitation. Light source unit 81 may be configured to include a lamp emitting white light and a color wheel. In this case, the color wheel is preferably disposed in the vicinity of an incident surface of the rod integrator. Light source unit 81 may be configured to include an LD and a phosphor wheel.

In image projection unit 100D and image projection apparatus 200D in the present embodiment having the above-described features, the holding member also holds digital mirror devices 10R, 10 GB so that no load is exerted on total reflection prisms 40R, 40 GB. Therefore, registration deviation is less likely to occur.

While the first to fifth embodiments are described above by way of example in connection with the case where the image projection unit includes the color synthesis prism, a plurality of total reflection prisms, and a plurality of digital mirror devices, this is not a limitation. The image projection unit may include a reflection prism instead of the color synthesis prism, a single total reflection prism, and a single digital mirror device.

In this case, the total reflection prism guides the light from the light source to the digital mirror device, and emits light reflected by the reflection-type image display element toward the reflection prism. The reflection prism emits the entering light toward the projection lens. Accordingly, an image is projected through the projection lens onto a screen. The reflection-type image display element is held by a holding member fixed to the reflection prism, while the reflection prism and the total reflection prism are supported by the base member.

Since the image projection unit which includes the reflection prism, a single total reflection prism, a single digital mirror device, the holding member, and the base member, as well as the image projection apparatus including the image projection unit are basically configured conformably to the image projection unit and the image projection apparatus including the image projection unit in the first to fifth embodiments. Therefore, the detailed description thereof will not be repeated herein.

In such an image projection unit and an image projection apparatus including the image projection unit, the holding member holds the digital mirror devices so that no load is exerted on the total reflection prisms, and therefore, registration deviation is less likely to occur.

Although the foregoing first to fifth embodiments are described by way of example in connection with the case where the color synthesis prism is directly fixed by bonding to the base member and a plurality of total reflection prisms are supported on the base member with the prism holding members fixed to the base member with an adhesive or a fastening member, this is not a limitation. Namely, the color synthesis prism and a plurality of total reflection prisms may be directly fixed by bonding to the base member at respective different positions.

While the description of the embodiments of the present invention is given above, the embodiments disclosed herein are given by way of illustration in all respects, not by way of limitation. The scope of the present invention is defined by claims, and encompasses all modifications equivalent in meaning and scope to the claims.

REFERENCE SIGNS LIST 2B, 2G, 2R holding body; 10B, 10G, 10R digital mirror device; 15B, 15G, 15R reflection-type image display element holding plate; 16B, 16G, 16R hole; 17B, 17G, 17R window; 20, 20A, 20B, 20C holding member; 21, 21B, 21G, 21R top plate; 21a plate-like portion; 21b, 21c, 21d, 21e corner portion; 21a0, 21a1, 21b0, 21b1, 21b2, 21b3, 21b4, 21b5 side; 22B, 22G, 22R, 27B, 27B1, 27B2, 27G, 27G1, 27G2, 27R, 27R1, 27R2 side plate; 27R2A, 31B, 31G, 31R protrusion; 28B, 28G, 28R reflection-type image display element holding part; 29, 29B, 29G, 29R connecting part; 30B, 30G, 30R attachment; 40B, 40G, 40R total reflection prism; 41G first prism; 42G second prism; 43 total reflection surface; 43G air gap layer; 44 reflection surface; 45 light incident surface; 46 light emission surface; 48G non-reached region; 50 base member; 51 foundation; 52 supporting rest; 60, 60D color synthesis prism; 60a emission surface; 61, 61D red light reflection surface; 62 blue light reflection surface; 70 prism holding member; 81, 89 light source unit; 81B blue light source; 81G green light source; 81R red light source; 82B blue light reflection dichroic mirror; 82R red light reflection dichroic mirror; 83A, 83B collimator lens; 89a light source; 89b reflective mirror; 90 rod integrator; 91, 92 relay lens; 93B blue-reflective mirror; 93G green-reflective mirror; 93R red-reflective mirror; 94 cross dichroic mirror; 94B blue light reflection dichroic mirror; 94R red light reflection dichroic mirror; 95 relay mirror; 99 projection lens; 100, 100A, 100B, 100C, 100D image projection unit; 200, 200D image projection apparatus

The invention claimed is:

1. An image projection unit comprising:
a light source unit;
a plurality of reflection-type image display elements each formed of a plurality of microscopic mirrors arranged on a matrix;
a plurality of total reflection prisms each provided for a corresponding reflection-type image display element among the plurality of reflection-type image display elements, and configured to guide light emitted from the light source unit to the corresponding reflection-type image display element and to emit the light reflected from the corresponding reflection-type image display element;

a color synthesis prism configured to receive respective lights emitted from the plurality of total reflection prisms, synthesize the lights, and emit the synthesized lights;

a holding member fixed to the color synthesis prism and holding the plurality of reflection-type image display elements; and a base member supporting the color synthesis prism and the plurality of total reflection prisms, wherein the holding member includes:
   a top plate disposed to sandwich the color synthesis prism between the top plate and the base member; and
   a plurality of side plates extending from the top plate toward the base member, the plurality of reflection-type image display elements are fixed to the plurality of side plates, and the plurality of side plates are bonded to the base member with an elastic adhesive.

2. The image projection unit according to claim 1, wherein
the holding member has a void configured to avoid interference of ON light and OFF light reflected from the plurality of reflection-type image display elements with ON light and OFF light entering the color synthesis prism through the plurality of total reflection prisms and emitted from the color synthesis prism.

3. The image projection unit according to claim 1, wherein
the holding member includes a plurality of holding bodies each provided for a corresponding one of the plurality of reflection-type image display elements.

4. The image projection unit according to claim 3, wherein
the plurality of holding bodies all have the same shape.

5. The image projection unit according to claim 3, wherein
at least one of the plurality of holding bodies differs in shape from other holding bodies.

6. The image projection unit according to claim 1, further comprising a plurality of prism holding members each holding a corresponding total reflection prism among the plurality of total reflection prisms, wherein
the color synthesis prism is directly fixed by bonding to the base member, and
the plurality of total reflection prisms are supported on the base member with the respective prism holding members fixed to the base member with an adhesive material or a fastening member.

7. The image projection unit according to claim 6, wherein
the plurality of total reflection prisms have respective non-light-reached regions where ON light and OFF light reflected from the reflection-type image display elements do not reach, and
the plurality of prism holding members are fixed by bonding to the respective non-light-reached regions.

8. The image projection unit according to claim 1, wherein
a spacer is disposed between the color synthesis prism and a corresponding one of the plurality of total reflection prisms.

9. The image projection unit according to claim 1, wherein
a region between the color synthesis prism and a corresponding one of the plurality of total reflection prisms is filled at least partially with a resin member.

10. The image projection unit according to claim 1, wherein
the plurality of reflection-type image display elements include two reflection-type image display elements,
the plurality of total reflection prisms include two total reflection prisms,
two color lights are emitted from the light source unit, and
the two color lights are synthesized by the color synthesis prism.

11. The image projection unit according to claim 1, wherein
the plurality of reflection-type image display elements include three reflection-type image display elements,
the plurality of total reflection prisms include three total reflection prisms,
three color lights are emitted from the light source unit, and
the three color lights are synthesized by the color synthesis prism.

12. The image projection unit according to claim 11, wherein
the color synthesis prism is a cross dichroic prism.

13. An image projection apparatus comprising: the image projection unit according to claim 1; and a projection lens configured to project an image emitted from the image projection unit.

14. An image projection unit comprising:
a light source unit;
a plurality of reflection-type image display elements each formed of a plurality of microscopic mirrors arranged on a matrix;
a plurality of total reflection prisms each provided for a corresponding reflection-type image display element among the plurality of reflection-type image display elements, and configured to guide light emitted from the light source unit to the corresponding reflection-type image display element and to emit the light reflected from the corresponding reflection-type image display element;
a color synthesis prism configured to receive respective lights emitted from the plurality of total reflection prisms, synthesize the lights, and emit the synthesized lights;
a holding member fixed to the color synthesis prism and holding the plurality of reflection-type image display elements; and
a base member supporting the color synthesis prism and the plurality of total reflection prisms, wherein
the holding member includes:
   a top plate disposed to sandwich the color synthesis prism between the top plate and the base member;
   a plurality of side plates extending from the top plate toward the base member; and
   a plurality of reflection-type image display element holding plates attached to the plurality of side plates, and disposed so as not to interfere with optical paths formed between the plurality of reflection-type image display elements and the plurality of total reflection prisms, and
the plurality of reflection-type image display elements are each fixed to a corresponding reflection-type image display element holding plate among the plurality of reflection-type image display element holding plates.

15. An image projection apparatus comprising: the image projection unit according to claim 14; and a projection lens configured to project an image emitted from the image projection unit.

16. An image projection unit comprising:
a light source unit;
a plurality of reflection-type image display elements each formed of a plurality of microscopic mirrors arranged on a matrix;
a plurality of total reflection prisms each provided for a corresponding reflection-type image display element among the plurality of reflection-type image display elements, and configured to guide light emitted from the light source unit to the corresponding reflection-type image display element and to emit the light reflected from the corresponding reflection-type image display element;
a color synthesis prism configured to receive respective lights emitted from the plurality of total reflection prisms, synthesize the lights, and emit the synthesized lights;
a holding member fixed to the color synthesis prism and holding the plurality of reflection-type image display elements; and
a base member supporting the color synthesis prism and the plurality of total reflection prisms, wherein
the plurality of total reflection prisms are arranged outside the color synthesis prism, and
at respective different positions, the color synthesis prism and the plurality of total reflection prisms are directly fixed by bonding to the base member.

17. An image projection apparatus comprising: the image projection unit according to claim 16; and a projection lens configured to project an image emitted from the image projection unit.

* * * * *